July 28, 1942.  N. E. WAHLBERG  2,290,923
AUTOMOTIVE SUSPENSION
Filed March 29, 1940  4 Sheets-Sheet 1

INVENTOR.
NILS ERIK WAHLBERG.
BY Carl J. Barber
ATTORNEY.

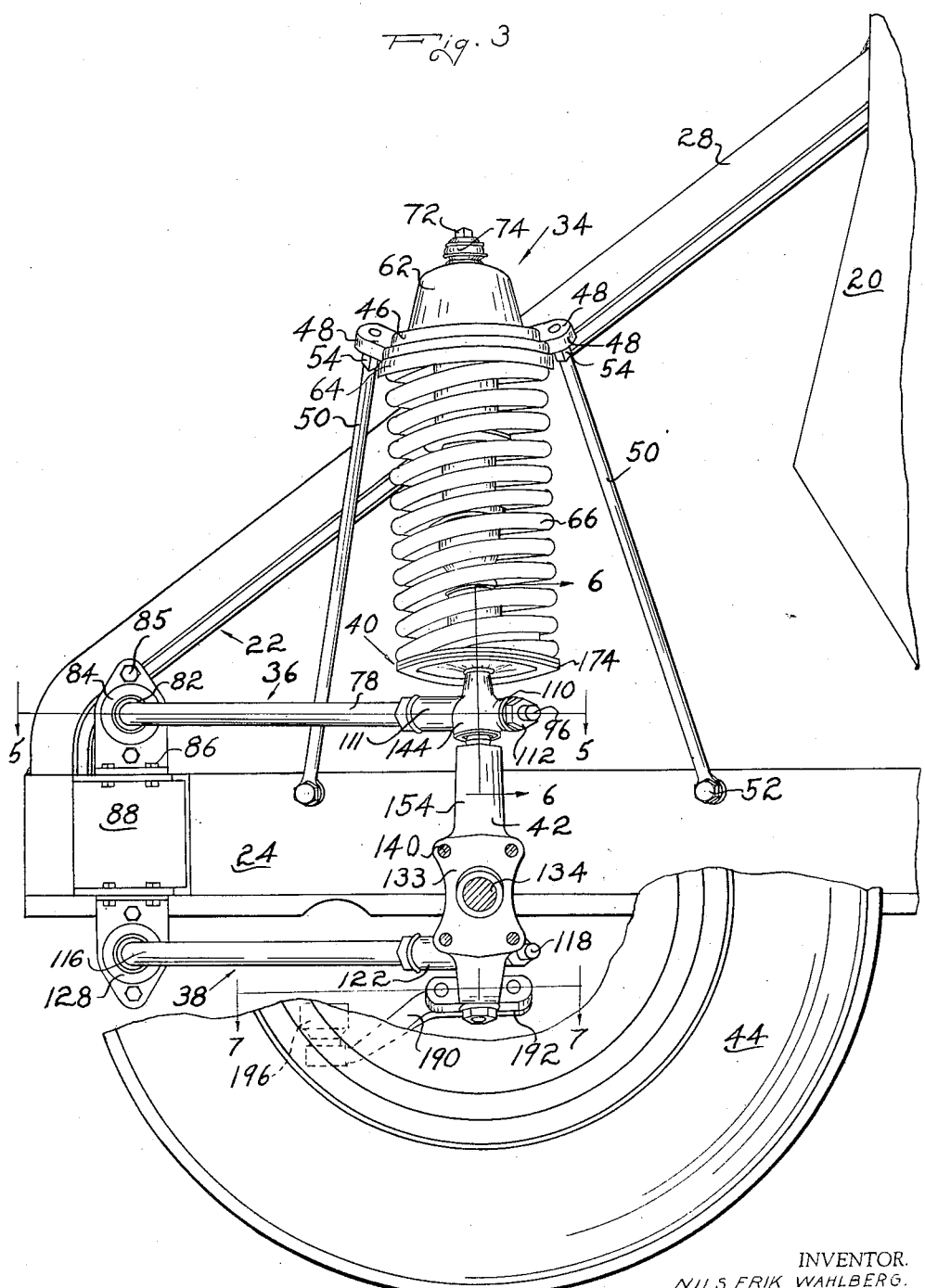

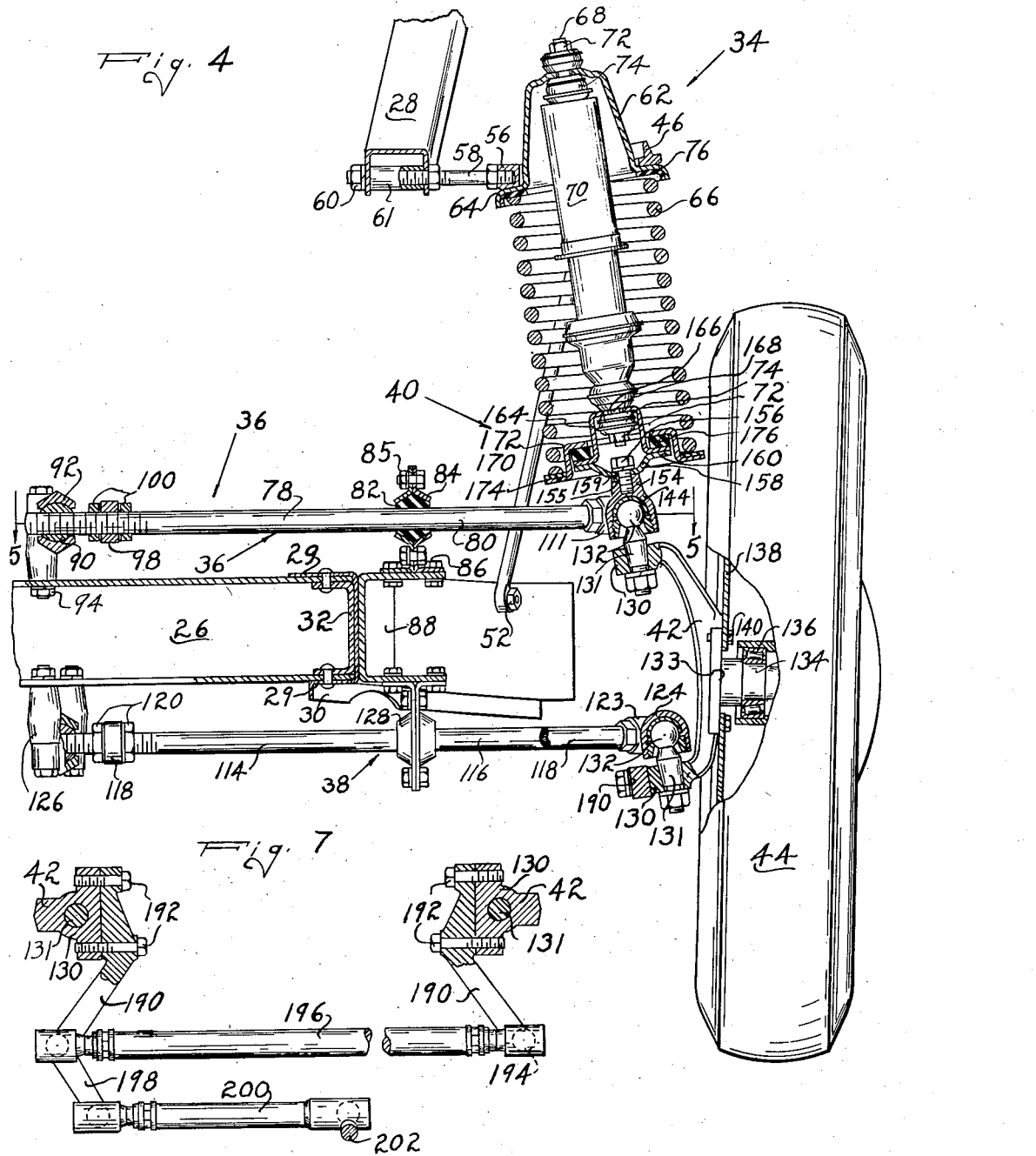

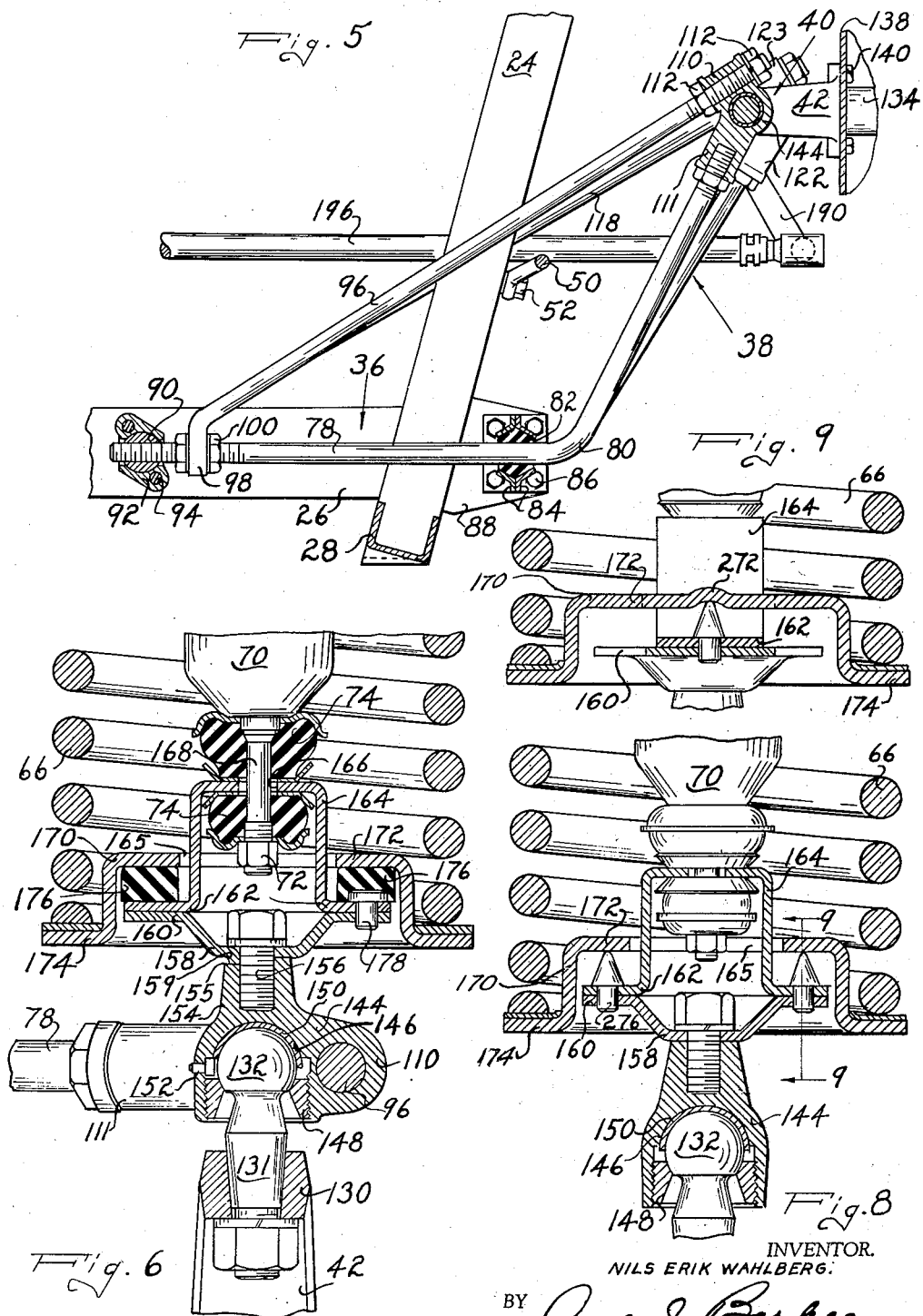

Patented July 28, 1942

2,290,923

UNITED STATES PATENT OFFICE 2,290,923

AUTOMOTIVE SUSPENSION

Nils Erik Wahlberg, Kenosha, Wis., assignor to Nash-Kelvinator Corporation, Kenosha, Wis., a corporation of Maryland Application March 29, 1940, Serial No. 326,557

12 Claims. (Cl. 280—96.2)

This invention relates to automotive suspensions and has particular reference to a novel method of independently mounting the front wheels of an automobile.

It is an object of this invention to provide a novel method of suspension in which the wheel support swings in a plane parallel to the longitudinal axis of the car.

It is another object of this invention to provide a wheel suspension mechanism which will be lighter than those known heretofore, and the parts of which will require less machining than other mechanisms.

It is another object of this invention to provide a wheel suspension employing a coiled spring in which the overhang of the point of contact of the wheel upon the ground beyond the intersection of a line passed through the axis of the spring and the ground may be reduced to zero.

It is another object of this invention to provide a wheel suspension using a coil spring in which the spring is free to shift its axis so as to always present the axis against the line of movement of the wheel.

It is another object of this invention to provide a wheel suspension using a coil spring in which the spring is mounted on the end of the control arm near its point of maximum travel.

Other objects and advantages of this invention will be apparent from a consideration of the following description and the attached drawings of which there are four sheets and in which Figure 1 represents a front elevation of an automobile frame with a wheel suspension embodying my invention installed mounted thereon;

Figure 3 represents a side elevation of the structure illustrated in Figures 1 and 2 and with the wheel partially broken away to more clearly illustrate the invention;

Figure 4 represents a vertical sectional view, partially broken away, taken substantially along the plane indicated by the broken line 4—4 in Figure 2 and looking in the direction of the arrows;

Figure 5 represents a section taken along the line 5—5 of Figures 3 and 4 and looking in the direction of the arrows;

Figure 6 represents a section taken along the line 6—6 of Figure 3 and looking in the direction of the arrows;

Figure 7 represents a section taken along the line 7—7 of Figure 3 and looking in the direction of the arrows;

Figure 8 is a view similar to Figure 6 and illustrates a modified structure embodying my invention; and Figure 9 represents a section taken along the line 9—9 of Figure 8 and looking in the direction of the arrows.

Figure 1:
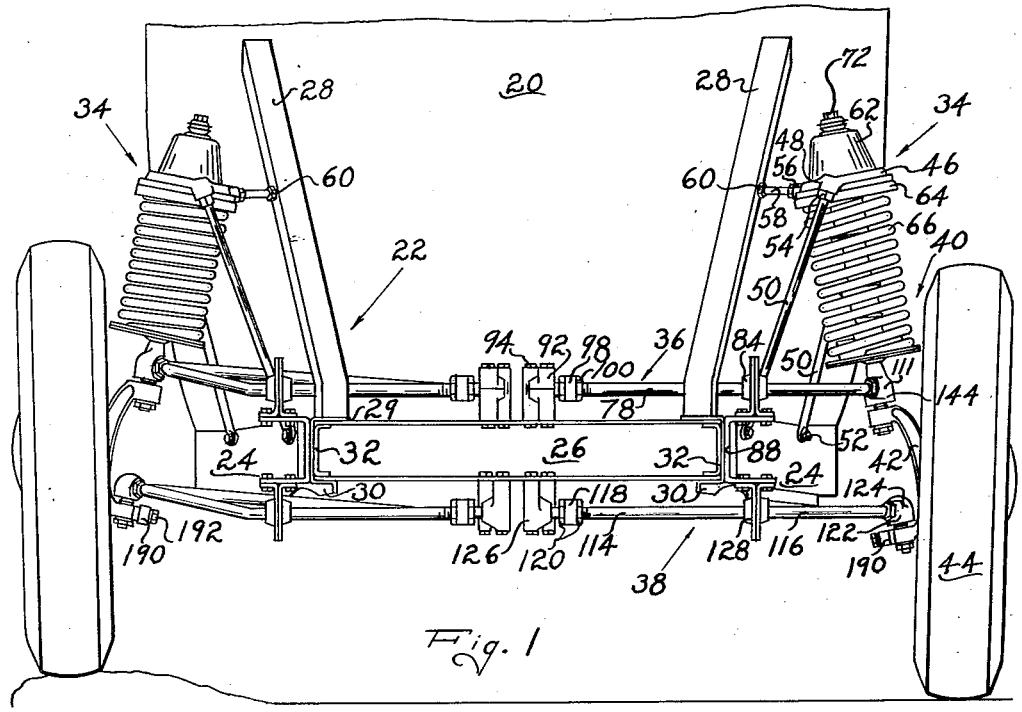
Figure 2:
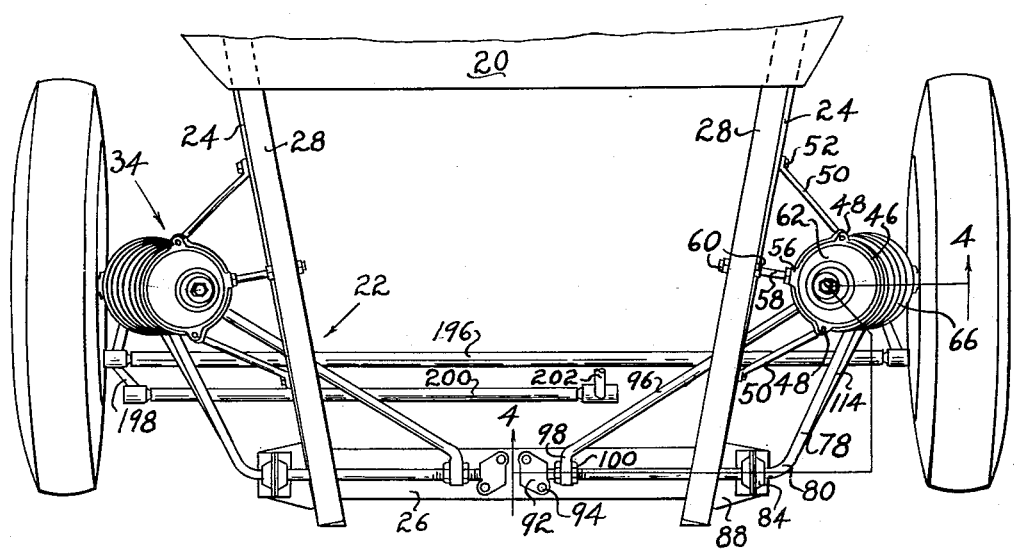
Figure 2 represents a plan view of the structure illustrated in Figure 1.

In the drawings, which are to be taken as descriptive rather than limiting on my invention, I have illustrated an automobile having a body 20 and a frame 22. The frame 22 consists more specifically of side rails 24 connected at their forward end by cross member 26 and provided with inclined brace members 28 which slope upwardly from the front of the side rails and backwardly to the body portion 20. The structure illustrated is particularly adapted to a unitary type of body construction in which the body is fabricated directly with the frame members rather than being added after the frame is completed. However, my invention is not necessarily limited to such construction. It will be noted that the side rails 24 consist of channel members having their flanges 29 faced inwardly and provided with a downturned flange 30 on the bottom flange. The cross member 26 is also channel-shaped in cross section having its flanges facing toward the front of the car. The cross member 26 fits between the flanges 29 of of the side rail members and may be attached thereto by any suitable means such as welding. I have provided the U-shaped brackets 32 which may be welded to the web of the side rail and the flanges of the cross member to strengthen the connection. The inclined brace members 28 are channel-shaped in cross section and may be fastened to the side rails as by welding.

My wheel suspension mechanism applied to this frame consists generally of an upper spring support indicated generally at 34, an upper control arm indicated at 36, a lower control arm indicated at 38, a lower spring support indicated at 40, and a steering knuckle 42 upon which is supported the wheel 44. Since the structure is duplicated on each side of the car, only one side will be described.

The upper spring support consists of a ring 46 on the front and back of which are formed as by forging along with the ring, the ears 48. These ears are drilled and tapped to receive the threaded ends of the brace rods 50, which extend downwardly, and terminate in eyes which are fastened to the side rail member 24 by means of bolts 52 passed through the eyes and the side rail. The upper ends of the braces 50 may be locked in position in the ears 48 by means of the lock nuts 54. On the side of the ring 46 next to the frame is provided a boss 56 which is drilled and tapped to receive the threaded end of a horizontal brace rod 58 which is passed through the inclined frame member 28 and secured thereto by means of the nuts 60. A spacer sleeve 61 may be provided (see Figure 4) to distribute the load of the rod 58 to both flanges of the inclined member 28.

The lower surface of the ring 46 forms an abutment for the inverted cup-shaped member 62 which has the flange 64 arranged to rest against the under surface of the ring. The cup member 62 forms an abutment and retainer for the coil spring 66 and the uppermost portion of the cup is apertured to pass the bayonet end 68 of a strut type shock absorber 70 which is fastened to the cup by means of the nut 72 and cushioned by the rubber biscuits 74 commonly supplied with shock absorbers of this type. It will be noted that I have provided a washer 76 of rubber or some other vibration dampening material between the spring 66 and the flange 64 of the cup-shaped member 62. This helps to prevent vibration from being transmitted from the wheels to the frame.

The upper control arm is most clearly illustrated in Figure 5 and consists of a forward rod 78 which extends transversely over the cross member 26 until it is carried beyond the side rail 24 where it is bent backwardly as at 80 and angles back to the lower spring support 40 where it is threaded into a boss 111 which will be more particularly described later. The rod 78 is supported in a rubber bearing 82 which is held between two stamped plates 84 which are oppositely deformed and apertured to form a socket between them for retaining the rubber bearing 82. The plates 84 are held together by the bolt 85. The plates 84 are fastened as by the bolts 86 to a generally U-shaped bracket 88 (see Figure 1) which may be welded or otherwise fastened to the outside of the side rail 24 just opposite the cross member 26. The inside end of the rod 78 is threaded to receive the drilled and tapped ball 90 which is retained in a socket formed between the upper and lower halves of the bracket 92. The two halves of the bracket 92 are drawn together around the ball 90 and the bracket itself is fastened to the upper flange of the cross member 26 by means of the bolts 94. The upper control arm 36 also includes a diagonal brace rod 96 which has its inner end flattened and bent over as at 98 and apertured to pass over the threaded portion of the rod 78. The rod 96 is retained in position on the rod 78 by means of the nuts and lock washers 100 threaded onto the end of the rod 78 on each side of the end portion 98 of the rod 96. The outer end of the rod 96 is threaded and passed through a boss 110 formed on the socket member 144 of the lower spring support 40 which will be more particularly described later. The position of the rod 96 relative to the boss 110 may be adjusted by turning the nuts 112 threaded on the outer end of the rod 96 on each side of the boss 110.

The lower control arm 38 is similar to the upper arm 36 which has just been described in detail. It consists of a front rod 114 which is positioned underneath the rod 78 and is bent backwardly at 116 so as to be substantially parallel to and under the upper rod 78. The lower control arm is also provided with a diagonal brace rod 118 (see Figure 5) which is fastened at its inner end to the rod 114 by means of the nuts 120 in the same manner in which the upper brace rod 96 is fastened to the rod 78. The outer end of the forward rod 114 of the lower arm is threaded into a boss 122 formed on a lower steering knuckle support socket 124.

The diagonal brace 118 is passed completely through a boss 123 and secured in the same manner as the upper diagonal brace 96 is secured to the boss 110. The entire lower arm is supported from the cross member 26 by means of a ball and socket joint 126 (see Figures 1 and 4) fastened on the underside of the cross member 26 in the same manner as the bracket 92 which holds the upper control arm on the top side of the cross member 26. The lower control arm is also provided with a bearing support 128 which is the same as the bearing support 84 for the upper arm 36 and is fastened to the underside of the bracket 88 in the same manner as is the bearing support bracket 84.

The steering knuckle 42 consists of a generally C-shaped forging (see Figures 1 and 4) having upper and lower arms 130 which are apertured to receive the conical ends 131 of ball pins 132. The upper ball 132 is received in the socket member 144 of the lower spring support assembly 40 and the lower ball 132 is received in the lower steering knuckle support socket 124. It will be noted, (see Figure 4) that the upper control arm does not extend as far toward the side of the car as does the lower control arm. This places the upper ball 132 and the upper end of the steering knuckle 42 nearer the center of the car than the lower ball 132 and the lower end of the steering knuckle. Formed on the outside of the steering knuckle 42 is a plane surface 133 which lies in a plane inclined slightly up and out from a vertical plane through the steering knuckle and on the opposite side of the vertical from an axis through the balls 132. Extending at right angles from the surface 133 is the spindle 134 on which the wheel 44 is mounted with the roller bearings 136. The flat surface serves to mount the backing plate 138 fastened to the flat surface by bolts 140. I contemplate that the angle between the plane of surface 133 and the axis through the ball pins 132 will be such that the plane and the axis will intersect at or near the point of contact between the wheel 44 and the road. Since the axis through the ball pins 132 is that about which the wheel and steering knuckle are turned in steering the car, my construction eliminates or reduces the tendency of the wheel reaction on the ground to turn the wheel about the steering axis. In effect the line of action of the rearward component of road shock forces is directed through or nearly through the axis about which the wheel is steered so there is no turning moment about that axis.

The lower spring support 40 is most clearly illustrated in Figure 6 and consists of a fitting 144 which is so shaped as by forging and machining so as to have the downwardly presented semi-spherical socket 146 within which is received the upper ball pin 132 of the steering knuckle. The ball pin is retained in place by means of the externally threaded annular ring 148 which is threaded into the fitting 144 below the socket 146 after the ball 132 has been located therein. I have provided the spherical portion of the socket 146 with a liner of bearing material 150, and I have provided the lubrication fitting 152 by means of which lubricant may be forced into the space around the ball 132. The fitting 144 is also provided with the bosses 110 and 111 which receive the outer ends of the rods 96 and 78 respectively as has been explained before.

Formed on the upper side of the fitting 144 is a boss 154 which is machined flat in a plane perpendicular to the axis of the socket 146 and is drilled and tapped to receive the cap screw 156. The cap screw 156 fastens the flat bottom of the cup-shaped stamping 158 to the top of the fitting 144. The stamping 158 has a finger 159 bent down from its bottom portion, which finger is engaged in a groove 155 in the boss 154 to prevent the stamping from rotating with respect to the boss. The stamping 158 is provided with a generally horizontal, annular flange 160 which is fastened by suitable means, such as welding, to the horizontal flanges 162 of a U-shaped clip 164. The upper surface of the U-shaped clip 164 is apertured at 166 to receive the bayonet end 168 of the shock absorber 70. The shock absorber is connected to the clip by the usual nut 72 and the connection is made semi-flexible by the rubber biscuits 74 in the same manner as that by which the top of the shock absorber is fastened to the upper spring seat 62.

Positioned around the clip 164 and apertured at 165 so that the clip may extend therethrough is the lower spring seat 170 having a central raised portion 172 surrounded by the annular flange 174 upon which the lower end of the spring 66 rests. The raised portion 172 serves to retain the spring 66 on the flange 174 and also forms a recess for receiving the flanges 160 of the cupped stamping 156 and 162 of the U-shaped clip 164. The raised portion of the spring seat 172 rests upon blocks 176 of rubber or some similar deformable material which are in turn supported upon the flanges 162 of the U-shaped clip 164. If desired, the blocks of rubber 176 may be retained in place on the flanges 162 by means of pins 178 which are vulcanized in the blocks and extend down through holes provided in the flanges 162 and 160.

From the above description it should be apparent that the lower end of the spring 66 and the lower end of the shock absorber 70 are supported from the fitting 144 which is rigidly connected to the upper control arm 36. The outer end of the upper control arm 36 and the fitting 144 are supported by the ball pin 132 on the top of the steering knuckle 42 which is supported from the ground by the wheel 44 and spindle 134. The rubber biscuits 74 of the shock absorber connection and the rubber blocks 176 between the lower spring seat and the U-shaped clip 164 are sufficiently solid to sustain and transmit the loads applied to the members but at the same time are sufficiently flexible to allow the spring and shock absorber assembly to rock on or change its alignment relative to the fitting 144 and the steering knuckle 42. They also function to prevent the transmission of vibrations from the wheel to the spring.

Considering the operation of the entire device, it should be evident that when the wheel 44 strikes a bump, it will raise the steering knuckle 42 which in turn rotates the upper and lower control arms 36 and 38 about their axes through the bearings 82, 90 and 126, 128 respectively. Since the upper and lower control arms are approximately equal in size and are positioned one under the other, the position of the steering knuckle 42 will at all times be maintained in the same angular position relative to a vertical plane through the longitudinal axis of the vehicle although it will move along an arc in a vertical plane parallel to the longitudinal axis of the car. Maintaining the steering knuckle in the same angular position as just described maintains the same camber and toe-in settings of the wheel and prevents scrubbing action of the tire on the road. While this movement of the steering knuckle 42 changes the relative alignment between the steering knuckle and the fixed upper spring support 46, the flexible mountings of the lower spring support 40 will allow sufficient movement of the lower spring seat 170 so that the spring 66 and shock absorber 70 will be subjected only to loads directly along the principal axis of the spring.

The mechanism for steering the vehicle is more clearly shown in Figure 7 and consists of a steering knuckle radius arm 190 which is fastened to the inside of the lower end of the steering knuckle 42 by means of the bolts 192. The arm 190 extends forwardly from the steering knuckle 42 and is provided with the conventional ball and socket joint 194 for receiving the tie rod 196 which connects the steering knuckle radius arms of the opposite wheels. One of the radius arms 190 is provided with an extension 198 to which is connected the drag link 200 for connection with the pitman arm 202 of any suitable steering gear (not shown).

In Figures 8 and 9 I have illustrated a modified method of supporting the lower spring seat upon the fitting 144 of the upper control arm. This connection is the same as that illustrated and described in Figure 6 in all respects except that the rubber blocks 176 between the raised portion 172 of the lower spring seat and the flange 162 of the U-shaped clip 164 have been replaced by the metal pins 276 positioned in holes formed in the flanges 162 and 160. The pins 276 have a conical upper portion and a cylindrical shank of smaller diameter than the base of the conical portion so that the conical portion forms a shoulder which rests upon the flange 162. If desirable the raised portion 172 of the lower spring seat may be raised slightly as at 272 (see Figure 9) to form a pocket for receiving the points of the pins 276. I contemplate that the cup-shaped stamping 158 and U-shaped bracket 164 and, therefore, the pins 276 will be positioned in a line transverse to the axis of the automobile so that the spring seat 172 may rock about the line of the pins 276 to keep the spring seat always parallel to the upper spring support 46 as the control arms swing about the supports 82, 92 and 126, 128.

From the above description it should be apparent that all the vertical road shocks are taken by the spring and shock absorber while the support arms serve only to guide the motion of the wheels in passing over uneven ground and to take side thrust and braking torque. Since the major loads usually applied to ordinary suspension are not applied to my control arms, the arms and their bearings may be made from lighter material which cuts down cost and unsprung weight.

Camber may be adjusted by removing the top of the socket bearing 92 and turning the ball 90 along the rod 78. Thus as viewed in Figure 4, if the ball is moved to the right and replaced in the socket, the entire upper control arm will be moved to the left moving the top of the steering knuckle to the left and decreasing the camber. The reverse of this procedure will increase the camber.

To change the castor adjustment of the wheel, the position of the rod 96 in the boss 110 of the lower spring support may be changed. Thus as viewed in Figure 5 if the outer end of the rod 96 is projected further through the boss 110 by loosening the inner nut 112 and tightening the outer nut, the outer end of the rod 78 will swing in an arc about the bend 80. Movement along the arc will move the fitting 144 and the top of the steering knuckle 42 toward the rear and increase the castor. A reverse procedure will decrease castor.

Since my mechanism is easily adjusted over a considerable range of positions, the parts need not be held to overly fine limits in manufacture and the cost of production is thus reduced.

What I claim is:

1. In an automobile having a transverse frame member, a wheel suspension comprising a pair of parallel control arms, transversely spaced journals supported along lines above and below the top and bottom of said cross member and arranged to pivotally support said arms along parallel axes transverse to the longitudinal axis of said automobile, end portions on said arms extending backwardly from said axes, and a steering knuckle pivotally supported between said end portions of said arms.

2. Automotive suspension including a steering knuckle, parallel control arms connected to said steering knuckle, one above the other, a plurality of means for supporting said arms forwardly of their point of connection with said steering knuckle, said control arm supporting means also allowing rotation of said arms about axes transverse to the longitudinal axis of the automobile, yieldable bushings in one of said supporting means on each arm, a journal comprising a ball and socket joint in the other of said supporting means on each arm, and spring means having a base rigidly attached to the automobile for cushioning the rotary movement of said arms.

3. In an automobile having a transverse frame member, a wheel suspension comprising a pair of control arms, pairs of transversely spaced journals secured on the top and bottom of said frame member, each of said arms being supported in one of said pairs of journals, yielding means in one journal of each of said pairs of journals, backwardly extending portions formed on the outer ends of said arms, a steering knuckle having a universal connection with the ends of said backwardly extending portions, a coil spring axially aligned with said universal connections in the normal position of said spring, and a fixed seat for said spring extending from the side of said frame, said spring bearing against one of said universal connections.

4. Automotive suspension including a steering knuckle, means for guiding the vertical movement of said steering knuckle including a rod mounted to rotate on an axis extending transversely of said automobile, the outer end of said rod being bent backwardly, a second rod extending between and secured to a point adjacent the inner end of said first rod and the outer end of said first rod to interbrace said rods, and means for changing the position of said second rod relative to said first rod to change the position of said steering knuckle relative to the vehicle.

5. In an automobile, a frame comprising side rail members and raised members positioned over the forward ends of said side rails, and a wheel suspension system comprising upper spring seats spaced laterally outwardly from said raised members, rods connecting said spring seats to said raised members, other rods extending downwardly from said spring seats and secured to said side rails, coil springs abutting against said spring seats, and steerable road wheels cushioned by said springs.

6. In an automobile, a frame comprising side rail members and raised members positioned over the foward ends of said side rails, and a wheel suspension system comprising upper spring seats spaced laterally outwardly from said raised members, rods connecting said spring seats to said raised members, other rods extending downwardly from said spring seats and secured to said side rails, coil springs abutting against said spring seats, and steerable road wheels cushioned by said springs, said rods being adjustably attached to said spring seats.

7. In an automobile having side rail members and raised frame members over said side rail members, rings positioned laterally outwardly from said raised members, rods connecting said rings with said raised members, other rods extending downwardly from said rings to said side rails, cup shaped spring seats having a flange around their open end seated against the undersides of said rings, coil springs abutting against said flanges, and shock absorbers secured to the closed ends of said cup shaped members.

8. An automotive suspension including a steering knuckle mounted to oscillate in an orbit parallel to the longitudinal axis of the car, a fixed spring seat on the car, a movable spring seat, a line support for said movable spring seat on said steering knuckle, said line support being transverse to the longitudinal axis of the car, and a coil spring positioned between said spring seats, said movable seat being seated upon but not attached to said line support.

9. An automotive suspension including a steering knuckle with a spindle thereon, a pair of supports one on each end of said knuckle, one of said supports being offset from the other laterally of the car, a pair of arms each having a ball and socket connection with one of said pair of supports, said arms arranged to rotate about axes transverse to the longitudinal axis of the car and being connected to said supports at points offset from said axes, and means for fixing said arms at a plurality of distances from the longitudinal axis of the car.

10. In an automotive suspension, a steering knuckle, a ball on said steering knuckle, a fixture having a socket arranged to receive the ball, a cup fixed to said fixture, an inverted U-shaped clip having flanges fixed to said cup, an inverted cup-shaped member defining an aperture at its midportion and having an annular flange therearound, said inverted cup-shaped member being positioned over said cup with said U-shaped clip projecting through said aperture, flexible blocks positioned between the flanges of said U-shaped clip and said inverted cup, a coil spring positioned on said annular flange, and a shock absorber fastened to the top of said U-shaped clip.

11. An automotive suspension including a steering knuckle mounted to oscillate in an orbit parallel to the longitudinal axis of the automobile, a fixed spring seat on the automobile, a movable spring seat, a line support for said movable spring seat on said steering knuckle, a clip attached to said line support and extending through said movable spring seat, a coil spring positioned between said spring seats, and a strut type shock absorber supported between said clip and said fixed spring seat.

12. An automotive suspension including a steering knuckle, control arms for supporting said steering knuckle, said control arms comprising rods extending transversely along a portion of the automobile and having a backwardly bent portion engageable with said steering knuckle, the inner ends of said rods being threaded, diagonal rods extending from the inner ends of said bent rods to the outer end thereof, nuts threaded on said bent rods on each side of the inner end of said diagonal rods, ball members threaded on the inner ends of said bent rods, supports defining sockets for supporting said balls, and supports for the intermediate portion of said bent rods, said last mentioned supports having a flexible journal therein.

NILS ERIK WAHLBERG.